US007256899B1

United States Patent
Faul et al.

(10) Patent No.: US 7,256,899 B1
(45) Date of Patent: Aug. 14, 2007

(54) WIRELESS METHODS AND SYSTEMS FOR THREE-DIMENSIONAL NON-CONTACT SHAPE SENSING

(75) Inventors: Ivan Faul, 323 Overlook La., Boulder, CO (US) 80302-9444; Waldean Allen Schulz, Boulder, CO (US)

(73) Assignee: Ivan Faul, Boulder, CO (US)

( * ) Notice: Subject to any disclaimer, the term of this patent is extended or adjusted under 35 U.S.C. 154(b) by 0 days.

(21) Appl. No.: 11/538,753

(22) Filed: Oct. 4, 2006

(51) Int. Cl.
G01B 11/14 (2006.01)
G06K 9/00 (2006.01)
G06T 17/00 (2006.01)
H04N 5/225 (2006.01)

(52) U.S. Cl. .................. 356/623; 356/608; 356/639; 382/154; 382/293; 345/420; 348/169

(58) Field of Classification Search ........ 356/603–640; 382/154, 293, 106; 345/420; 348/169, 180
See application file for complete search history.

(56) References Cited

U.S. PATENT DOCUMENTS

| 4,737,032 | A | | 4/1988 | Addleman |
| 5,198,877 | A | | 3/1993 | Schulz |
| RE35,816 | E | | 6/1998 | Schulz |
| 5,850,289 | A | * | 12/1998 | Fowler et al. ............... 356/603 |
| 5,920,395 | A | | 7/1999 | Schulz |
| 5,969,822 | A | * | 10/1999 | Fright et al. ................ 356/608 |
| 6,216,029 | B1 | * | 4/2001 | Paltieli ......................... 600/427 |
| 6,512,838 | B1 | * | 1/2003 | Rafii et al. .................. 382/106 |
| 6,608,688 | B1 | | 8/2003 | Faul |
| 6,611,617 | B1 | | 8/2003 | Crampton |
| 6,709,116 | B1 | * | 3/2004 | Raskar et al. ................ 353/121 |
| 6,724,930 | B1 | * | 4/2004 | Kosaka et al. .............. 382/154 |
| 6,829,384 | B2 | * | 12/2004 | Schneiderman et al. .... 382/154 |
| 6,980,302 | B2 | * | 12/2005 | Knighton et al. ........... 356/607 |
| 7,009,717 | B2 | | 3/2006 | Van Coppenolle |
| 7,106,885 | B2 | * | 9/2006 | Osterweil et al. ........... 382/103 |
| 2002/0175994 | A1 | * | 11/2002 | Sakakibara et al. ......... 348/135 |
| 2005/0069172 | A1 | * | 3/2005 | Uchiyama .................... 382/100 |

OTHER PUBLICATIONS

Polhemus, "Fastscan", Apr. 2003, Polhemus, Colchester, VT.
GFM, "ILS Intelligenter Lichtschnittsensor", May 2000, GFM Gesellschaft für Meβtechnik mbH, Aachen, Germany, http://www.gfm-aachen.de/.

(Continued)

*Primary Examiner*—Sang H. Nguyen
(74) *Attorney, Agent, or Firm*—Hansen Huang Tech Law Group LLP

(57) ABSTRACT

Methods for acquiring an approximation of the surface geometry of a 3-dimensional object include projecting pattern of structured light on the object, moving the pattern with respect to the object, acquiring images of the intersection of the light on the object over time, determining local coordinates of points on the intersection with respect to the pattern, tracking the position of the pattern, transforming the local coordinates to object coordinates, and accumulating the points as a model of the surface of the object. The methods include a step for wirelessly and possibly compactly transmitting geometrical data which characterizes an intersection for a given position of the scanner with respect to the object. Systems for embodying the method include a self-powered wireless, non-contact optical scanner, the location and orientation of which may be tracked with respect to an object coordinate system.

16 Claims, 7 Drawing Sheets

OTHER PUBLICATIONS

Metris, "XC50-LS Cross Scanner", downloaded May 31, 2007, Metris, Leuven, Belgium, http://www.metris.com/cmm_scanners/.
Opton, "L Series ( )Surftizer LN-206D", downloaded May 31, 2007, Opton & Co. Ltd, http://www.opton.co.jp/techrep/md/md1_4/md1_4in/mde1_4_n.html.
Breuckmann, "stereoScan", Jul. 2006, Breuckmann.
GOM, "ATOS", downloaded May 31, 2007, GOM mbH, Braunschweig, Germany, C:\documents\HHTLG\clients\1007 B I G\003 wireless Spraylight\RCE\GOM - Measuring Systems - ATOS.mht.

* cited by examiner

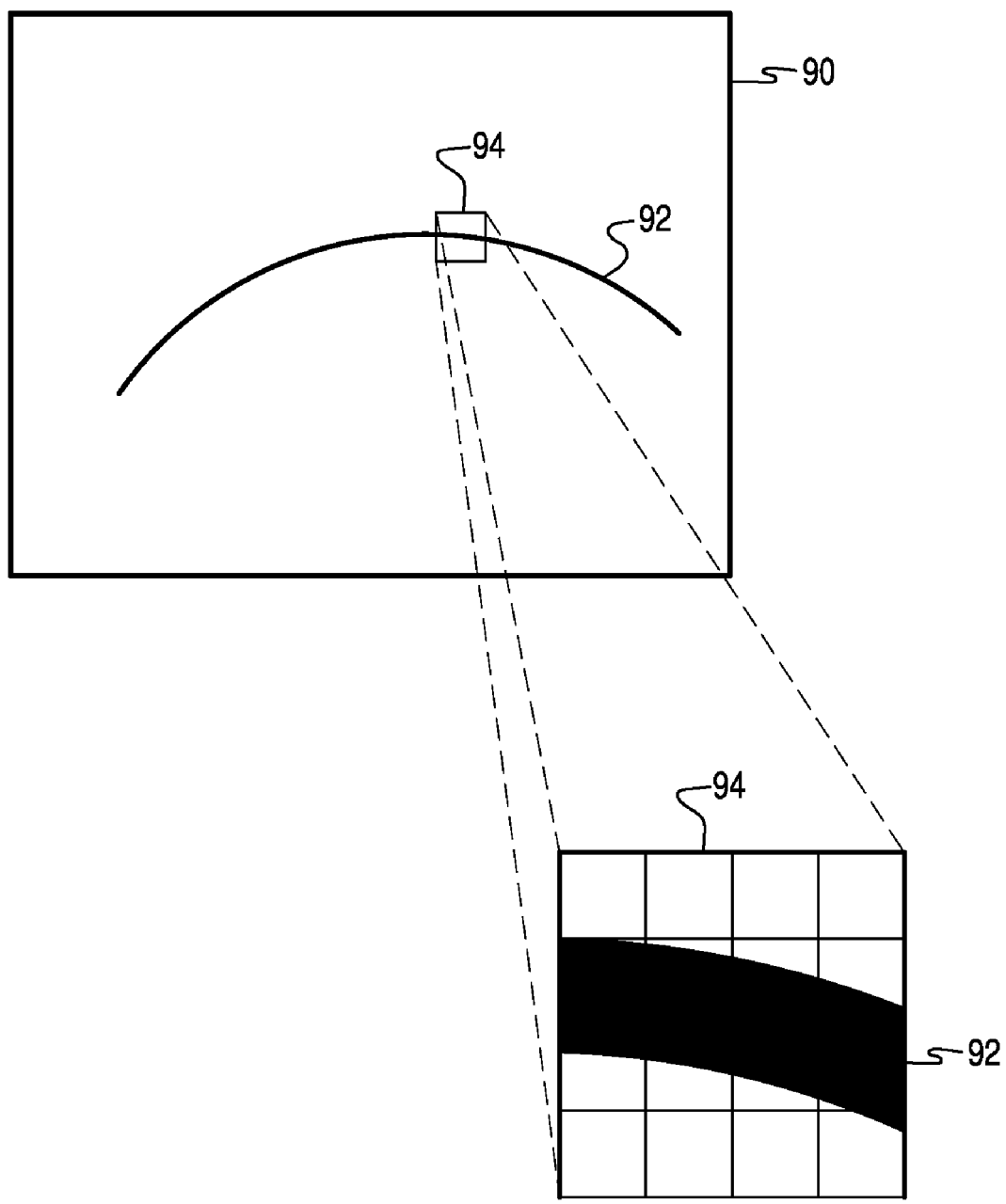

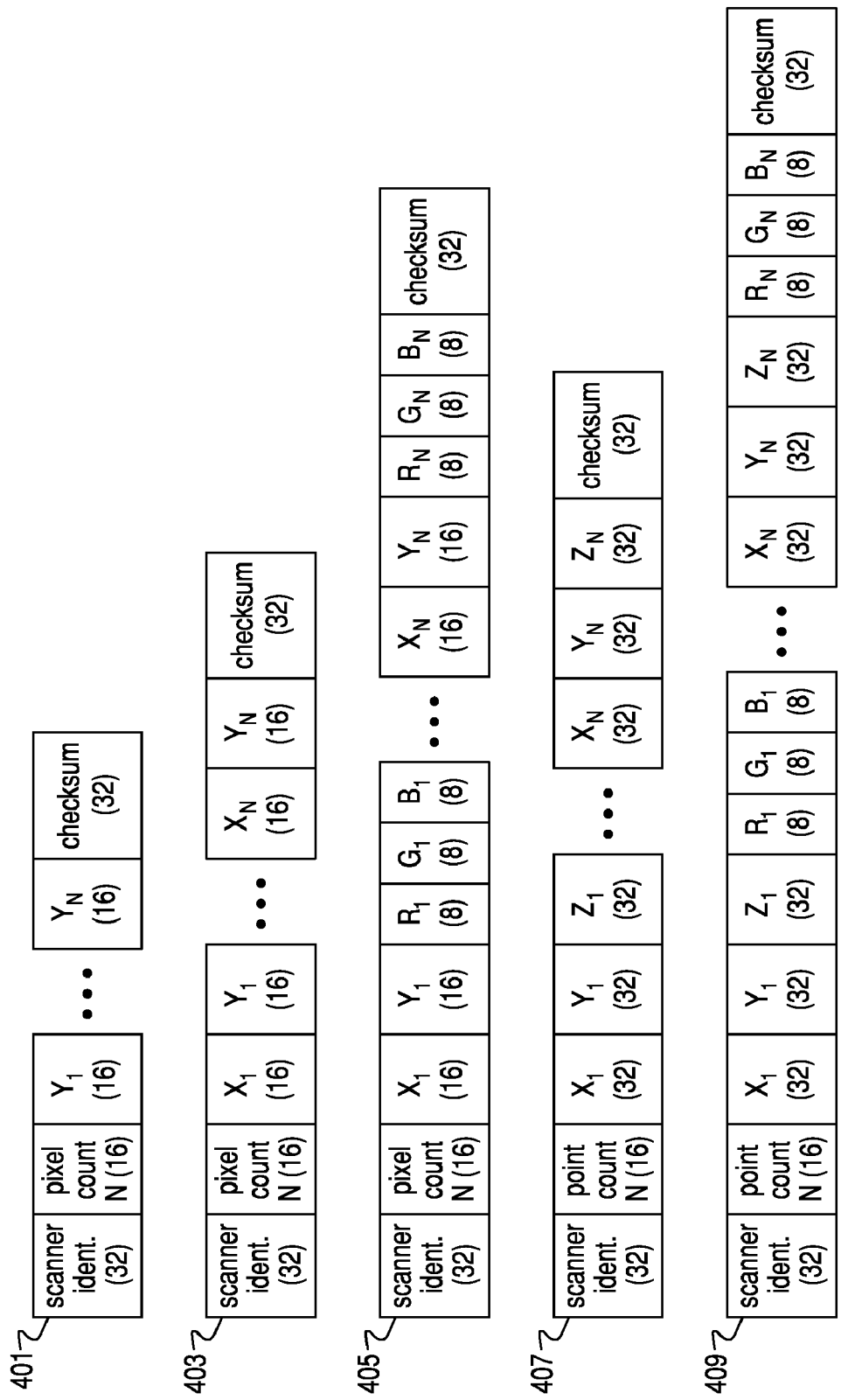

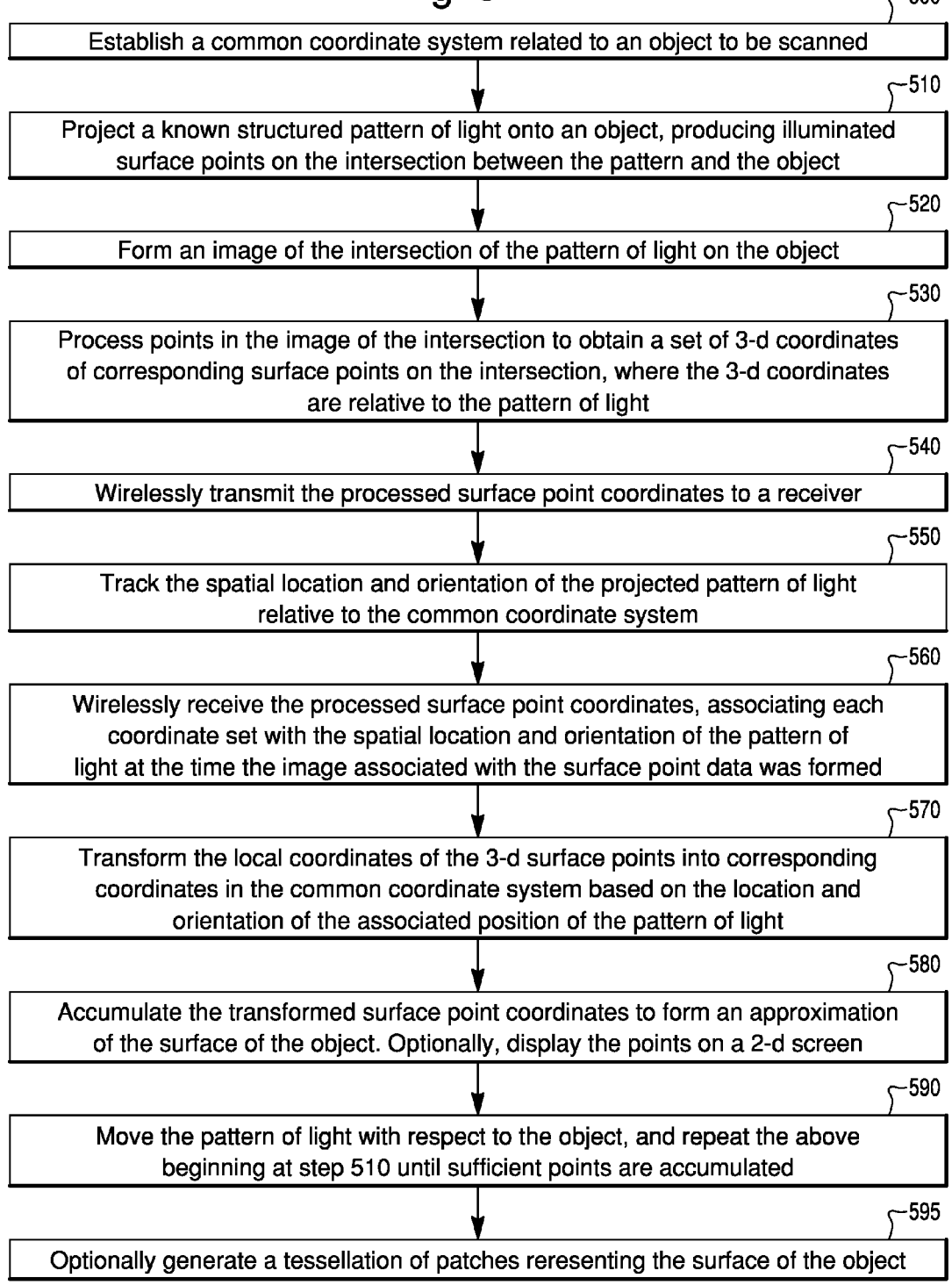

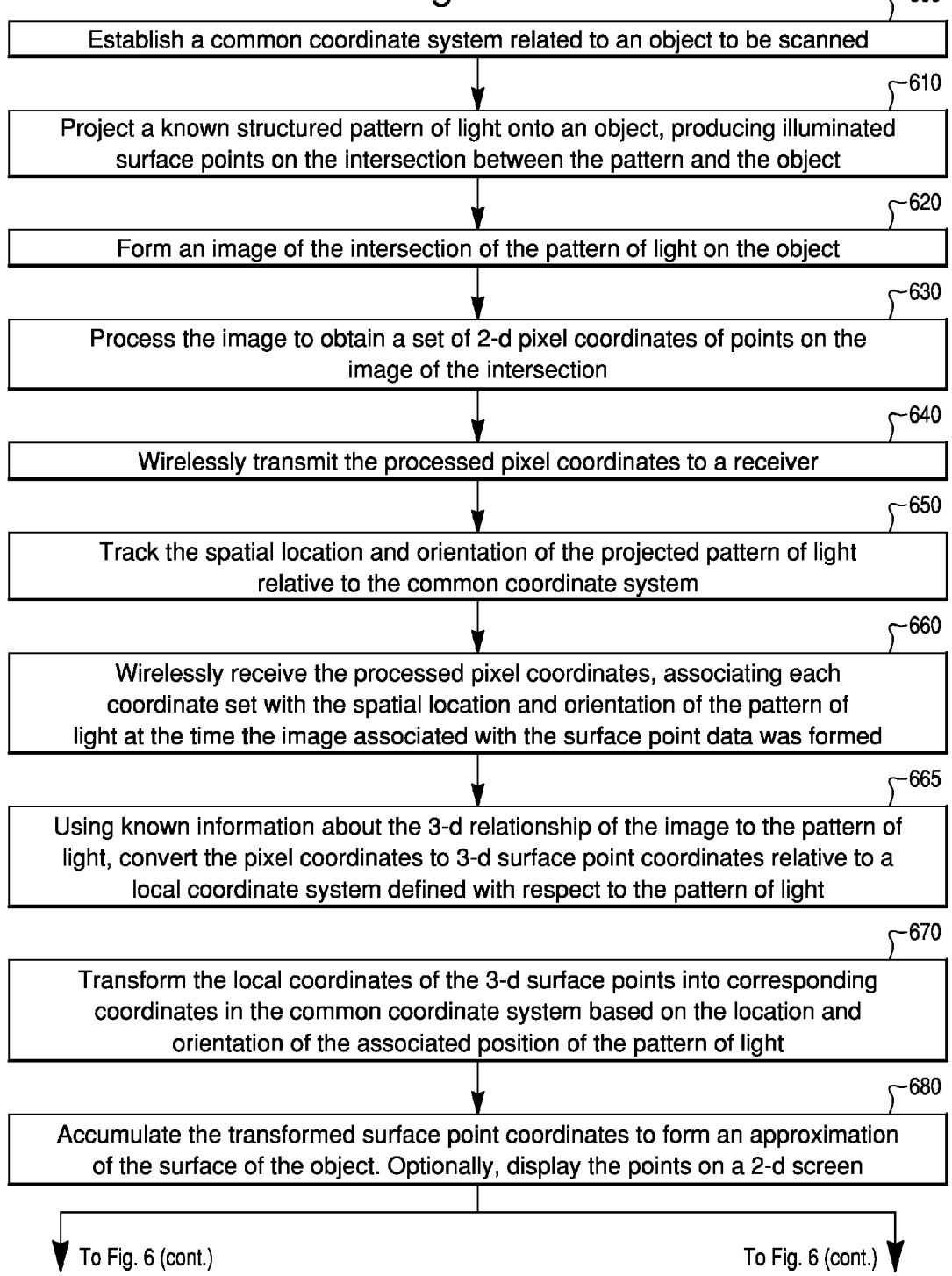

WIRELESS METHODS AND SYSTEMS FOR THREE-DIMENSIONAL NON-CONTACT SHAPE SENSING

CORRESPONDING RELATED APPLICATIONS

None

FIELD OF THE INVENTION

The present invention relates to methods and systems for wireless, non-contact mensuration of the surface shape of a three-dimensional object or features thereof.

BACKGROUND OF THE INVENTION

Presently, computer graphics, 3D modeling of real-world objects in software, and 3D mechanical design are in widespread use. Accordingly, it is desirable to capture an approximate computer software model of an existing physical object. In many cases, it may suffice for the model to be a "point cloud" of surface points sampled from the physical object. In a more sophisticated model, the points are vertices of abutting planar polygonal patches which approximate the surface of the object. In an even more sophisticated model, the patches are curved, each defined by a bivariate polynomial or rational mathematical function, as in the NURBS surfaces commonly used in computer graphics. Special cases of 3D data entry also rely on parametric entry, where the geometric shape (circle, sphere, cube, etc.) of the object is known and the parametric features are specified in order to be retained during scanning.

Numerous approaches exist which automate or partially automate the process of sampling representative points from the surface of an object. One approach generates a single point at a time, as a contact probe tip is moved across the surface of the object. Traditional coordinate measuring machines (CMMs) as well as handheld magnetic, mechanical, and optical probe tracking systems have historically used this contact probe approach. Computer-aided design (CAD) software can be used to accumulate the measured points and to build therefrom a 3-dimensional model of the surface of the object. An example of a handheld, optically tracked probe and its tracking system are the FlashPoint and 3D Creator products sold by Boulder Innovation Group, Inc. (Boulder, Colo.).

Another approach might include various laser or optical beam non-contact probes, which operate similar to the contact probe approach. However, the "probe tip" is a narrow light beam together with an optical sensor, which accurately measures the length of the ray-like beam to where it intersects the object at a point. That distance together with knowledge of the exact position of the light beam allows computation of the 3-dimensional XYZ coordinates of the point where the beam intersects the surface of the object. By gathering sufficiently dense points from the object, software can create a suitable model of the surface of the object. To date, such non-contact probes are tethered at least by an electronic cable, if not by additional mechanical linkage.

Rather than a single ray-like laser beam, more advanced non-contact scanners project a planar "fan" of light to illuminate many points on the object, where the intersection of the light and the object forms an illuminated stripe or contour line on the object. These scanners are sometimes called "laser stripe triangulation" scanners. One or more video cameras acquire a 2D dimensional image of the contour line from a position offset from the plane of light. In effect, the image of the contour line on each camera simultaneously captures the locations of many surface points all on one plane through the object. This speeds the process of gathering many sample points, while the plane of light (and usually also the receiving camera) is laterally moved so to "paint" some or all of the exterior surface of the object with the plane of light. By knowing the instantaneous position of the camera and the instantaneous position of the plane of light within a object-relative coordinate system when the image was acquired, a computer and software can use triangulation methods to compute the coordinates of illuminated surface points. As the plane is moved to intersect eventually with some or all of the surface of the object, the coordinates of more points are accumulated.

A number of commercially available systems employ the technique of projecting a manually moveable plane of light and imaging the illuminated intersection of the light on the object. Examples include, the U.S. Pat. No. 4,737,032 (Cyberware, Inc., Monterey, Calif.), the FastSCAN (Polhemus Inc., Colchester, Vt.), and K-Scan (Metris N. V., Leuven, Belgium).

Other systems project more than one plane of light onto the object, or project even more complex patterns of structured light. Examples are Metris's X-Scan product and U.S. Pat. No. 7,009,717 by Coppenolle et al, which is incorporated herein by reference.

Other systems project a pattern of light that is modulated by sequentially increasing and decreasing the light line widths, sometimes using a Gray Code Sequence. One variation of this moves the line pattern over the object, referred to as "phase shift encoding". Examples of these systems are GFM Messtechnik, ABW-3D, both of Germany, Opton (Japan), stereoSCAN by Breackmann and GOM of Germany.

To date, such non-contact scanners are tethered at least by an electronic cable, if not by further mechanical linkage. For example, see U.S. Pat. No. 6,611,617 of Crampton.

SUMMARY OF THE INVENTION

The present invention is directed toward a method and a system for wireless three dimensional shape sensing and mensuration.

The method provides steps which generate a virtual 3-dimensional model approximating the surface geometry of the object. The system generates a virtual 3-dimensional model approximating the surface geometry of an object.

The method projects a pattern of structured light on the surface of the object, acquires images of the intersection of the light with the object's surface, and processes each image to generate an intermediate set of surface data characterizing the intersection relative to the position of the pattern of light at the moment the image was acquired. The process tracks the position of the pattern of light with respect to the object over time. The surface data is wirelessly transmitted to a receiver which is connected to a computer which correlates each surface point datum with the temporally corresponding position of the pattern of light, transforms the surface point data into coordinates of points with respect to an object coordinate system. The transformed points are the basis of a virtual 3-dimensional model of the object.

The system uses a 3-dimensional (3D) object coordinate system in a fixed or otherwise known relationship to the object, and the system uses a non-contact scanner. The non-contact scanner employs a source of a pattern of structured light, an electro-optical imager, an image processor, a wireless data transmitter, and a scanner position indicator.

The non-contact scanner projects the structured light pattern onto the object. The light reflected from the illuminated intersection of the light pattern with the object at a particular moment is imaged by the electro-optical imager. The image processor generates surface point data which characterize the locations of points on the intersection relative to the scanner position indicator. The wireless transmitter transmits the image and/or surface point data wirelessly to a data receiver.

The system also uses a scanner tracking subsystem which essentially continuously determines the 3D position (location and orientation) of the scanner position indicator, over time and with respect to the object. A computing module is in wired or wireless communication with the data receiver and to the scanner tracking subsystem. The computing module correlates each received surface point datum temporally with the position of the scanner position indicator at the time the intersection containing the surface point was imaged, transforms the received surface point data according to the correlated scanner positions, and generates a set of 3D surface point coordinates which are relative to the object coordinate system. The set of surface points are used to model approximately the object's surface.

The method and the system assume that the position of the pattern of light and the position of the object are not necessarily fixed with respect to each other. Further, the method and the system assume that over time the pattern of light and the object move relative to each other to illuminate eventually a sufficient number of points on the surface of the object. The relative motion may be effected manually or automatically.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

FIG. 3 is an example of a video image of the intersection of a plane of light with an object together with an expanded close-up view of 16 pixels from the video frame (raster), some pixels of which contain a part of the image of the intersection.

FIG. 4 gives several examples of wireless data formats.

FIG. 5 depicts a flow diagram of the steps of an embodiment of the method.

DETAILED DESCRIPTION OF THE PREFERRED EMBODIMENTS

Various embodiments of the present invention will be described in detail with reference to the accompanying drawings. Wherever possible, the same reference numbers will be used throughout the drawings to refer to the same or like parts.

Note that herein the position of some (rigid) physical body means both its 3-dimensional location and its 3-dimensional orientation. As is common practice in computer science, the location of the body may be represented as the spatial XYZ coordinates of a specified reference point or marker on the body with respect to a defined Cartesian coordinate system. Further, the orientation of a body may be represented by yaw, pitch, and roll angles with respect to a defined reference orientation, by a quaternion, or by a conventional 3-by-3 rotation matrix. As is also common practice, the position may alternatively be represented by a single 4-by-4 homogeneous coordinate transformation matrix.

As used herein, the terms "about" or "approximately" for any numerical values or ranges indicate suitable dimensional tolerances that allow the part or collection of components to function for their intended purposes as described herein.

Figure 1:
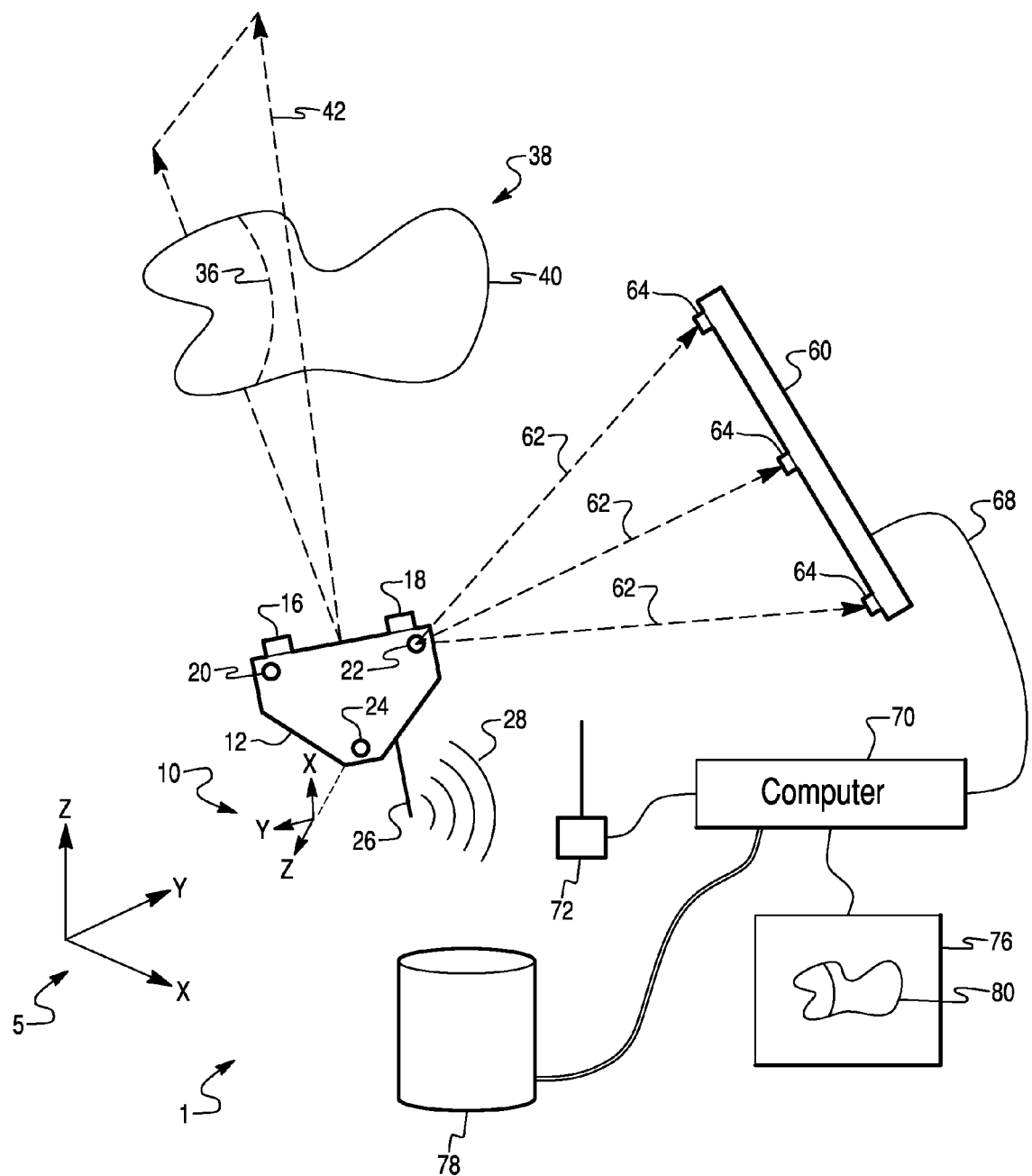
FIG. 1 is a block diagram of an embodiment of the present invention.

With reference to FIG. 1, the system 1 is used in conjunction with a physical object 38 (not properly part of the system itself) with a surface 40 which at least partially reflects light.

Wireless, non-contact scanner 12 projects a pattern of structured light 42, which is depicted in FIG. 1 as a single planar "fan" of light. In alternative embodiments, the pattern may simply be one or several narrow rays of light, may be multiple planes of light, or may be a more geometrically complex pattern of light.

In the embodiment where the pattern is simply a single, static narrow ray-like beam, the beam is, for example, generated by a laser diode and a collating lens. The single, narrow ray-like beam intersects the object 38 as a single tiny spot of light at a specific surface point at a specific moment of time. Alternatively, a pattern may be generated by rapidly sweeping a ray of light within a plane or through a more complex volumetric pattern, which pattern may at least partially intersect with the object. The ray may sweep through the whole pattern during a brief period of time (such as a fraction of a second).

In alternative embodiments, the pattern of structured light is generated by projecting coherent light through a hologram or a diffraction grating to generate a planar "fan" of light, a Moiré fringe pattern, or a more complex set of multiple rays, planes, or curved surfaces in 3D space. Alternatively, the structured light can be generated by an optical projector such as a slide projector or digital video projector. In the case of a digital video projector, the geometry of the pattern of structured light may be dynamically varied so that different patterns are projected over time. In each of the embodiments, the pattern of structured light may be automatically moved across portions of the object without having to move the scanner itself. For the simple planar pattern of light 42 depicted in FIG. 1, the intersection 36 with the object 38 is an illuminated contour line 36 on the surface 40 of the object 38. The video image of a contour line may require less image processing than the intersection 36 of a more complex structured light pattern 42 on the object 38 will require.

Examples of systems projecting structured light include systems sold by GOM GmbH (Braunschweig, Germany) and GFMesstechnik GmbH (Berlin, Germany). In these systems the scanner is not hand-held, is placed at a fixed position, or is moved mechanically.

At least one optical imaging sensor 16 or 18, such as a video camera housed in scanner 12, captures the intersection 36 of the pattern of light 42 with the object 38 as a 2D video image. The video image data may be processed further to compress the data or to exclude extraneous image data that is not part of the video image of the intersection 36. The image processing may be implemented using an on-board digital microprocessor (not shown). The image of the illuminated intersection 36 characterizes a portion of the surface shape 40 of the object 38. If the pattern of light 42 is a plane, then the intersection 36 is equivalent to a contour line (that is, a cross-section of a portion of the surface).

Unless specified otherwise, the following descriptions of embodiments will assume that the pattern of structured light may be composed of one or more rays, planes, or curved sheets of light. Then the image of an intersection 36 in a camera 16 or 18 normally will be composed of illuminated points, lines, or curves, not large illuminated areas.

In an embodiment, the image processing may discard some or all of the video pixels which are not part of the image of the illuminated intersection 36. For example, the image processor may simply discard all video information after determining the 2D numerical coordinates for one or more points in the image of the intersection 36. The coordinates of any such point in the image of the intersection 36 will be relative to the position of the scanner 12 and the pattern of light 42 at the instant in time the image was acquired. Integer coordinates may simply identify one or more video pixels which the optical real image of the intersection 36 illuminates. An embodiment may use interpolation between pixels to arrive at fixed or floating-point coordinates for a subpixel location which may coincide with the centerline of the image of the intersection 36. For example, suppose a small portion of the image is roughly linear but illuminates two or more adjacent pixels which are oriented roughly perpendicularly across that portion of the image. Then the intensity-weighted average (centroid) of the pixels' coordinates may represent a 2D subpixel location on the centerline of the portion. The location can be represented by fixed point or floating point numerical coordinates, which express finer resolution than integral pixel coordinates can. For this reason, it may be desirable for the image of the intersection 36 to be more than one pixel wide in general. This may be accomplished by slightly blurring the image (intentionally) or by ensuring that the intersection 36 on the object 38 is not too narrow.

An embodiment may further transform the 2D subpixel coordinates of such a point on the image into 3D coordinates relative to a local Cartesian coordinate system defined with respect to the scanner 12 and/or the pattern of light 42. This transformation may be performed in a microprocessor within scanner 12, or within a separate computer 70. The mathematics of such transformations is well known, especially in the field of photogrammetry. See e.g., *Manual of Photogrammetry*, Fourth Edition, American Society of Photogrammetry, Falls Church, Va. More generally, the 2D and 3D coordinates and transformations are well known and described in books on analytic geometry and 3D computer graphics such as *Computer Graphics. Principles and Practice*, by Foley et al (Addison-Wesley, Reading, Mass.).

In the case where the structured light pattern 42 is simply a single ray-like beam, a lens and a 1-dimensional CCD (or PSD or the equivalent) may suffice as the imaging sensor 16. A commercially available example of a combination diode laser beam, lens, and 1-dimensional PSD is the MX1C (IDEC Corp, Sunnyvale, Calif.) displacement sensor. This displacement sensor generates an analog output current corresponding to the coordinates of the image of the intersection spot 36 on the MX1C. That is, the MX1C generates an output current corresponding to the distance to where the beam intersects an object within its range. The amount of current may be digitized using an analog-to-digital converter (ADC) and converted to a numerical distance value using a calibration table. Together with the known location and orientation of the source of the beam 42 with respect to the scanner 12, a microprocessor may use the distance to compute the 3D location of the intersection 36 with respect to a local coordinate system relative to scanner 12. As the beam is moved to illuminate eventually all or part of the surface 40 of object 38, a large collection of surface points may be sampled.

More than one lens and sensor 16 or 18 may be used to image the intersection point 36 of the beam 42 from several angles. This may particularly be advantageous when the intersection 36 lies within a depression or beyond a step-like discontinuity, so that the intersection can be seen from at least one angle, if not all angles. In another embodiment, there may be several displacement sensors (each with their own ray-like beam of light) used to measure more than one surface point simultaneously. In that case, the structured pattern 42 comprises several ray-like beams of light, possibly each with a different color to help distinguish them.

Embodiments projecting any particular pattern of structured light 42 (simple or complex) may use more than one video camera 16 or 18 to view the intersection 36. This may advantageously provide redundant data for more accuracy or may allow at least one camera to image surface points which are not visible to another camera because of extremes in surface topography.

The data generated by scanner 12 may include the whole, raw video frame acquired by any imaging sensor 16, 18. The data may include a compressed or further processed form of a raw video frame. The data may include the computed pixel or subpixel coordinates of various points on the image of the intersection 36 formed on each imaging sensor 16, 18. The data may include the computed 3-dimensional coordinates of various surface points of the intersection 36 derived from the subpixel coordinates of its image, where the 3D coordinates are relative to a local scanner coordinate system 10 in known relationship to scanner 12 and to structured pattern 42. Regardless of its form, the data directly or indirectly characterizes a portion of the geometry of object 38 as a subset of points on surface 40 relative to the scanner coordinate system 10. In one embodiment, several of the above computations are performed in a microprocessor within scanner 12. In alternative embodiments, all or some of these computations are deferred—to be performed by separate computer 70.

The geometric data, in one or more of the above forms, is transmitted wirelessly via data transmitter 26. The medium of transmission 28 may be one or more of the following: modulated radio frequency signals, modulated infrared signals, or modulated signals of some other wavelength. The transmission medium 28 may utilize a proprietary protocol or an industry standard such as IEEE 801.11 WiFi, Bluetooth, IRDA, or any other current or future standard.

U.S. Pat. No. 6,608,688, which is incorporated herein by reference, presents a tracking system which tracks wireless instruments such as probes. That patent describes one or more moveable trackable instruments each with position indicators, which are tracked in a coordinate space, and to transmit and receive various data wirelessly. In particular, the patent discloses techniques for synchronizing the tracking of multiple wireless instruments and for multiplexing the wireless communication with those multiple instruments.

The geometric data sent by data transmitter 26 may be augmented by brightness or color data from the image of each sensor 16, 18, so that the surface model 80 of the object 38 can include color or texture data in addition to geometrical shape data. To capture color data most accurately, an embodiment may utilize a color camera and a structured pattern of white light or a pattern which includes a variety of wavelengths.

The data transmitter 26 generally must transmit a substantial amount of information—possibly as much as a stream of video image pixels and/or many image subpixel coordinates and/or 3D surface point coordinates. Therefore, a relatively high speed communication protocol may be required, such as megabits per second. This does depend on the rate at which image pixels are acquired or at which surface coordinates are computed. That is, the communication protocol rate may be dictated by the particular form and amount of data transmitted, or vice versa.

A 2-dimensional frame of image pixels can be transmitted as a stream of many bytes (for monochrome) or many byte triplets (for color). The protocol may use some proprietary or standardized raw or compressed format, such as JPEG. If an embodiment transmits the pixel or subpixel coordinates of points on the image of the intersection 36, and if at least 10 video frames are acquired per second, at least hundreds of pixel coordinates may need to be transmitted per second. Each pixel coordinate may comprise several bytes, so a minimum communication rate of megabits per second may be necessary. Such a transmission rate may apply also to an embodiment in which the pixel coordinates are first transformed into 3D surface point coordinates relative to the scanner 12 by a microprocessor within scanner 12. Other slower wireless protocols such as Bluetooth, ZigBee, or IRDA may be used in embodiments where the pattern of structured light is a single ray of light and only a few coordinates are to be transmitted per second.

At lease one trackable position indicator 20, 22, or 24 is attached to, is part of, or is in fixed or otherwise known relationship to handheld scanner 12. The trackable position indicator may be represented by a point on a high contrast geometrical pattern. Alternatively, a position indicator 20, 22, or 24 may be (the center of) a retro-reflective marker (such as a small disk or ball) and may be illuminated by an external light source (not shown in FIG. 1). A position indicator 20, 22, or 24 may also be an actively illuminated point-like source of light, such as a light emitting diode (LED). For example, a position indicator 20, 22, or 24 may be the emitting end of an optical fiber which is illuminated by a light source at the other end of the fiber. For position indicators 20, 22, or 24 which are small or point-like, more than one will be required in order to ascertain accurately the 3-dimensional orientation of the scanner 12 and therefore the orientation of the pattern of projected light 42. In such an embodiment, at least three non-collinear position indicators 20, 22, or 24 (preferably separated as widely as practical) may be located on the scanner 12.

A source of energy (not shown in FIG. 1), such as a battery, supplies power to one or more components of the scanner 12. Components requiring energy may include the source of structured light 42, the optical imaging sensor, any image processor present, any powered position indicators, any microprocessor for coordinate computation, the data transmitter 26, and any other associated electronics. In an embodiment, a battery may be rechargeable, may be permanently housed in scanner 12, and may be recharged through an external connector built into scanner 12. In other embodiments, the source of energy may comprise any one or more of the following: a battery, an electromagnetic energy receiver-converter, a solar cell, a storage capacitor, a fuel cell, and any future energy source or energy storage technology.

The scanner 12 may include memory accessible from a built-in microprocessor so that calibration data, identification, and other descriptive information characterizing the scanner 12 may be available. For example, the geometric details about the pattern of structured light 42, the position indicator or indicators 20, 22, 24, the number of sensors 16, 18, the serial number, and so forth may be stored on-board on scanner 12. The details in memory may be transmitted upon start-up, transmitted from time to time by data transmitter 26, or used internally by a microprocessor in scanner 12. The details may include location or orientation coordinates, data formats, or other description.

Scanner tracking subsystem 60 tracks and computes the location and orientation of at least one position indicator 20, 22, or 24 on scanner 12 with respect to an object 3-dimensional coordinate system 5. Given the location and/or orientation of sufficient position indicators 20, 22, or 24, the position of the scanner 12 may be determined—as is commonly done by optical tracking systems like the FlashPoint. Given a local coordinate system 10 on scanner 12 and the locations (and orientations if relevant) of the position indicators in it, there is a linear transformation T between the scanner coordinate system 10 and the object coordinate system 5 at a given instant in time. It is noted that transformation T will change dynamically as scanner 12 is moved and may be recomputed continuously. T may be implemented by a homogeneous matrix as is common in computer graphics. T can be used to transform the surface coordinates relative to scanner coordinate system 10 into coordinates relative to coordinate system 5. Coordinate system 5 may actually be the the de facto or built-in coordinate system of subsystem 60 or may be explicitly defined by the user during a separate initialization step.

In an embodiment using tiny or point-like position indicators 20, 22, 24 (such as marked by LEDs or retro-reflective spheres or dots or prisms), at least three non-collinear position indicators must be located. The locations of non-collinear position indicators unambiguously specify the location and orientation (that is, the 3D position) of the scanner 12. Because the pattern of light 42 is in a known relationship to the scanner 12, the location and orientation of the pattern of light 42 may also be determined. For example, a local coordinate system 10 may conveniently be defined on scanner 12, and the location and orientation of the pattern of light 42 and position indicators 20, 22, 24 may be defined by means of 3D coordinates with respect to the local scanner coordinate system 10.

FIG. 1 depicts a scanner tracking subsystem 60 with three sensors 64, although a tracking subsystem 60 may employ fewer or more sensors 64. An embodiment may employ as the scanner tracking subsystem 60, for example, the FlashPoint system of Boulder Innovation Group, Inc. (Boulder, Colo.), which employs three 1-dimensional CCD sensors. Another example of an optical tracking system is the Polaris sold by Northern Digital, Inc. (Waterloo, Ontario, Canada), which employs two 2-dimensional imaging sensors. An embodiment may use any 3D tracking system for subsystem 60—even one which is non-optical, such as a magnetic tracking system. Any 3D tracking system may be used, as long as the location and orientation of the pattern of light 42 may be determined in real time sufficiently accurately for the system to acquire a satisfactory approximation of the surface geometry of a 3-dimensional object.

The embodiment of FIG. 1 shows the pattern of light 42 being projected from scanner 12 and the intersection 36 of that pattern with the object 38 being imaged by at least one imager 16 and/or 18 also located in the same scanner 12. However, the pattern of light 42 need not necessarily be fixed with respect to an imager 16 or 18, if the structured pattern 42 is tracked by tracking subsystem 60 with respect to coordinate system 5, and if each imager 16 or 18 is also tracked by tracking subsystem 60 with respect to coordinate system 5. In effect, scanner 12 may be split into two or more parts, each of which may be tracked independently, and each of which comprises sufficient position indicators 20, 22, 24 to allow tracking subsystem 60 to determine the position of each part. One part includes the means of projecting the structured light 42. Another part includes the sensor for imaging the intersection 36 of that light with the object 38 and would include the data transmitter 26. Because each part may be separately moved, the position of each part may be described by its own 3D transformation matrix which describes the location and orientation of the corresponding part with respect to object coordinate system 5. The transformation matrix for the pattern of light 42 can be used to transform points, rays, or planes of the structured light pattern at a given moment of time into the object coordinate system 5. The transformation matrix for an imager 16 or 18 can be used to transform the image-forming ray corresponding to a point in the image into the object coordinate system 5.

For simplicity and clarity, the specification assumes that the pattern of structured light 42 is fixed with respect to each imaging sensor 16 or 18. However, the methods and systems described herein can operate with the use of the split scanner as well.

The computer 70 collects the data received by data receiver 72 and collects the 3D scanner positions of scanner 12 from tracking subsystem 60. Computer 70 temporally correlates the received data from receiver 72 with the scanner position data so that the received data for a given image of an intersection 36 is associated with the position of the scanner at the time the image of the intersection 36 was acquired. A timestamp from an internal millisecond clock may be associated with each datum received by receiver 72 and with each collected scanner position measurement. The data received from receiver 72 and the collected scanner position measurements are associated by matching data and measurements acquired at essentially the same time. This allows the computer 70 to transform the coordinates in the coordinate data received by receiver 72 to 3D coordinates in the object coordinate system 5.

The computer 70 accumulates coordinates of points on some or all of the surface 40. These coordinates were previously transformed to be relative to the object coordinate system 5. The accumulation of the object-relative coordinates forms a point cloud, which at least partially models the surface geometry 40 of object 38. The computer 70 may further model the surface 40 by using the point cloud to construct a tessellation of abutting 3D patches to form a 3D surface approximating the surface 40 of object 38. The patches may simply be planar polygons such as triangles or quadrilaterals. The patches may be curved surfaces, the shapes of which may each be described by a parameterized, multivariate function such as a polynomial, rational polynomial, or other function, as is commonly used in computer graphics. Curved patches may allow a more accurate representation of the geometry 40. Alternatively, curved patches may allow for a more compact surface model with fewer patches.

An embodiment may display the accumulated points or patches on a graphics screen 76—either during the scanning process to give user feedback or at least after the scanning process is complete. Some or all of the accumulated points or patches of the model can be saved to permanent storage 78 such as a disk drive, CD-ROM, flash memory, or the like. The points or patches may be further transmitted wirelessly or over wires to a graphics workstation or other computer.

The format of the saved 3D geometrical model may be custom, proprietary, or an industrial CAD standard.

In an embodiment, the object coordinate system 5 may be static with respect to the tracking subsystem 60, in which case the object 38 should not move with respect to tracking subsystem 60 during the scanning process. In another embodiment, the coordinate system 5 may dynamically move with respect to the tracking subsystem as long as the coordinate system 5 remains fixed (or is in an otherwise known relationship) with respect to object 38 during the scanning process and the tracking system also tracks the position of the coordinate system 5 relative to itself. In the latter case, the coordinate system may be defined by one or more reference position indicators—similar to the indicators 20, 22, 24 on the scanner 12 for example—which are located fixedly with respect the object 38. The reference position indicators may possibly be mounted on a rigid reference body affixed to object 38. A technique to provide a coordinate system 5 which may dynamically move in fixed relationship with object 38 during scanning (but not necessarily remain in fixed relationship to subsystem 60) is presented in U.S. Pat. No. 5,920,395, which is incorporated herein by reference.

Although FIG. 1 illustrates only one wireless scanner 12, more than one wireless scanner 12 may be present in the volume in which tracking subsystem 60 operates. Furthermore, other moveable tracked instruments may need to be tracked in the volume, such as contact probes or a rigid reference frame defining a coordinate system 5. Each instrument has its own positional indicator or indicators and may be wireless also. Alternatively, both wireless and wired scanners may be used in the volume in which tracking subsystem 60 operates. As above, each instrument has its own positional indicator or indicators regardless of whether the scanner is wired or wireless.

Figure 2:
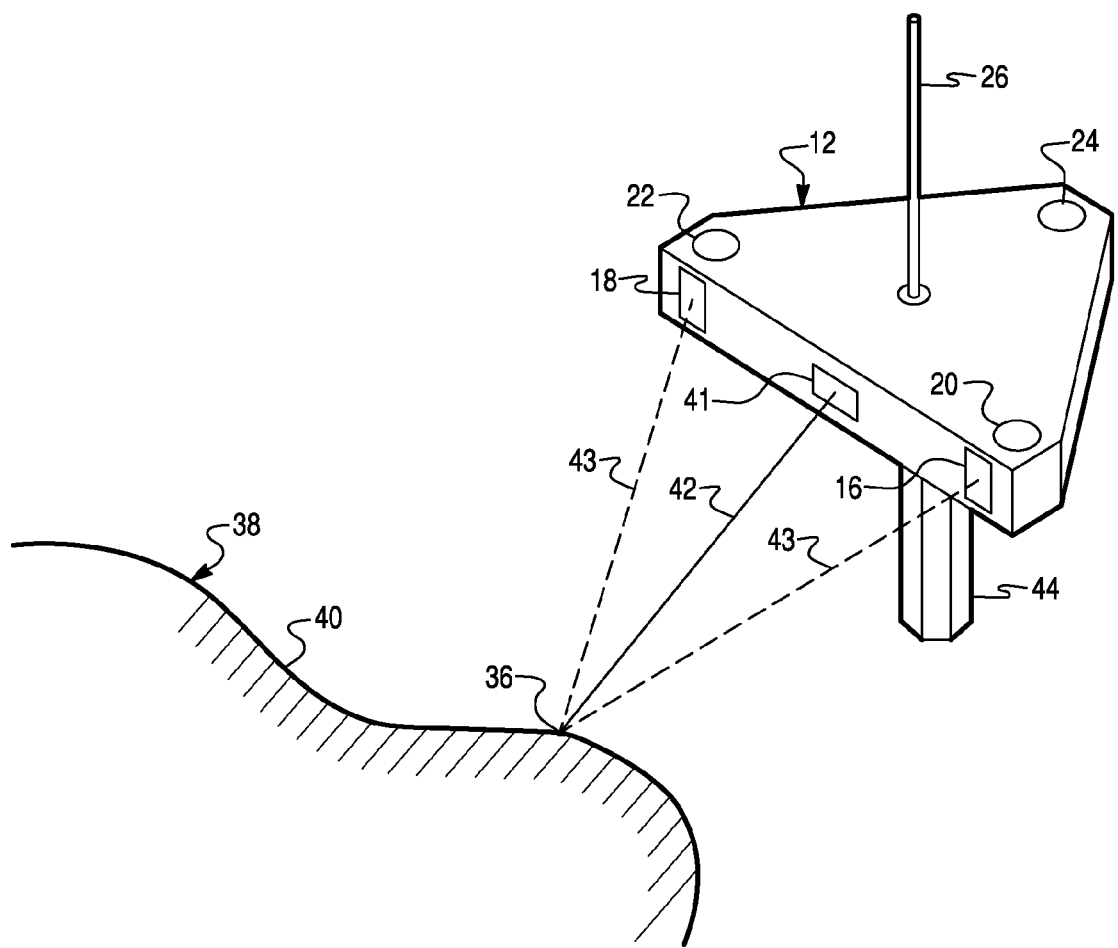
FIG. 2 is a perspective illustration of an embodiment of a handheld wireless scanner and an object being scanned.

FIG. 2 is a perspective drawing of an embodiment of scanner 12. As shown, the scanner 12 includes a source 41 of pattern of structured light 42. The pattern 42 as shown in the figure is simply a single ray-like beam of light directed toward object 38 with surface 40 and intersects surface 40 at intersection point 36. Nevertheless, a variety of patterns may be employed. FIG. 1 shows two imaging sensors 16 and 18. As previously noted fewer or more imaging sensors may be present. Lines 43 depict rays of light reflected from intersection 36 back to the imaging sensors 16, 18 to form an image of the surface point 36 in each imaging sensor 16, 18. Structured light pattern 42 may emerge from scanner 12 at a fixed angle or scanner 12 may automatically sweep light pattern 42 through some trajectory.

Data transmitter 26, depicted as an antenna, repeatedly transmits data characterizing the location of an intersection point 36 relative to the scanner 12, as scanner 12 is moved, so that the pattern of structured light is moved over at least a portion of the surface 40 of object 38. In addition to the locations of intersection points 36 on surface 40, transmitter 26 may also transmit data characterizing the coloration or texture of surface 40. For example, transmitter 26 may transmit raw monochrome or color intensities taken from the pixels of sensors 16 or 18.

Data transmitter 26 may forego retransmission of essentially redundant data, if the scanner 12 does not move with respect to the object 38 after an image is first acquired.

Transmitter 26 may be part of a transceiver, which also receives configuration parameters, operational commands, or other input signals. Such parameters, commands, or signals control the operation of scanner 12. Configuration parameters, for example, dictate the rate, format, or kind of information to be transmitted. Operational commands, for example, dynamically alter the size, shape, color, or intensity of the structured light 42.

Handle 44 in FIG. 2 is optional, but may be convenient for handheld operation of the scanner 12. If handle 44 is present, it may be a convenient structure in which to place a rechargeable energy source such as a battery.

Scanner 12 comprises one or more position indicators 20, 22, 24, sufficient in number to allow a scanner tracking subsystem (as described above) to determine the location and orientation of scanner 12 accurately and unambiguously. Three tiny or point-like optically-tracked, non-collinear indicators 20, 22, 24 are show in FIG. 2. Three non-collinear indicators are normally needed in order for a scanner tracking subsystem (60 in FIG. 1) to determine the 3-dimensional location and the 3-dimensional orientation of the scanner 12. An exception, for example, is the case in which a ray-like beam 42 can be collinear with just two or more position indicators 20 and 24 collinear with the ray.

FIG. 3 is an example of a video image 92 of the intersection of a plane of light with an object together with an expanded close-up view of 16 pixels 94 from the video frame 90, some pixels of which contain a part of the image 92 of the intersection. The camera is located outside the plane of the light and is oriented so that the pixel rows of its video frame 90 are approximately parallel to the plane of light (structured pattern). Then the image 92 (shown as black) of the intersection generally extends left to right across the frame 90. Because the image illuminates more than one pixel within each column of pixels, interpolation may be possible using a weighted average (centroid) computation. This would yield a subpixel location in which each (vertical and horizontal) coordinate may be represented by a finer resolution fixed-point or floating-point number rather than just integral row and column coordinates.

FIG. 4 lists several examples of potential data record formats (as bit sequences), which may be used to transmit data from transmitter 26 to receiver 72. The numbers in parenthesis in each field indicate the number of bits that may be needed to represent the field's value as a binary integer, a fixed-point binary value, or a floating point number. In all examples, the "scanner ident." field may be a serial number uniquely identifying the scanner transmitting the data. The "scanner ident." may identify known properties or calibration information specific to a particular scanner and stored in a database in computer 70 (of FIG. 1). The "checksum" may be a 32-bit value which may simply be the 32-bit sum of all the preceding fields, for example, and used to verify transmission integrity. In an embodiment, other fields may be present, such as a prefix bit pattern to help identify the beginning of a record format or a field which contains a scanner status/error code.

Data record format 401 of FIG. 4 may be used to transmit video camera frame data compactly, such as the image depicted in FIG. 3. Format 401 assumes that the intersection is a contour line on the surface of the object and that the camera is oriented so that the contour line forms an image on the camera's frame which extends roughly left to right in the frame. Then for each column of pixels, the image crosses the column at most in one place and occupies one or more adjacent pixels (if any at all) of the column. If the image occupies more than one pixel for a given column c, then interpolation may be used to compute a subpixel location for the vertical center $Y_c$ of the image in column c. If no pixel of column c is illuminated by the image, then $Y_c$ may be set to some exceptional value (such as zero). Note that format 401 requires far fewer bits than for transmitting the camera's video frame (raster) in a more normal fashion. Because most video cameras contain fewer than several thousand pixels per column, only the most significant 12 bits (for example) may be required for representing (vertical) integral pixel Y coordinates. Thus the least significant 4 bits can be used to represent fractions of an interpolated vertical subpixel coordinate as a 16-bit fixed-point binary value with 4 bits to the right of the binary point.

Data record format 403 of FIG. 4 may be used to transmit video camera frame data compactly. Format 403 is more general than format 401 and may be used to transmit more general image geometries than that exemplified in FIG. 3. For record format 403, some or all of the pixels which contain the image of the intersection may be transmitted. In this case, the $X_i$ and $Y_i$ coordinates would both be interpolated values, representing a local centroid of a tiny piece of the image, such as a 5-by-5 pixel "window" straddling a part of the image.

Data record format 404 of FIG. 4 is similar to format 403, except that it also includes red-green-blue (RGB) color intensities corresponding to each $X_i$ and $Y_i$ location in the image. The RGB color values may themselves be interpolated or may be copied from the pixel in which the location $(X_i, Y_i)$ is located. For monochrome scanners, a single 8-bit field can replace the three 8-bit R, G, and B fields.

Data record format 407 of FIG. 4 is an example of how 3D coordinates may be transmitted. This embodiment assumes that a microprocessor within scanner 12 (of FIG. 1 or FIG. 2) transforms subpixel coordinates of given points on the 2D image into 3D XYZ coordinates of surface points of the object. The 3D XYZ coordinates would be relative to the local coordinate system 10 of the moveable scanner 12 and of its pattern of structured light 42. An advantage of such an embodiment is that computer 70 (of FIG. 1) may not need to know any details about scanner 12, such as the geometry of its structured light pattern, the number of cameras, and the type and resolution of the cameras. That is, the scanner may be somewhat of a "black box" with regard to such details.

Data record format 409 of FIG. 4 is similar to format 407, except that RGB color data about each corresponding XYZ point is also included.

Using the example formats of FIG. 4 and the processing performed in wireless scanner 12 (of FIG. 1) can significantly reduce the amount of transmitted geometric and color data compared to the data conventionally sent by a video camera over a cable. Processing the image data within a "smart" scanner 12 also can distribute the processing among several computers and can allow the scanner 12 to be more device-independent. Many variations of tracked scanners may be truly interchangeable if certain conventions are uniformly followed. Namely, all variations of tracked scanners 12 must transmit data according to the same data record format (such as 409). In addition, all interchangeable variations of tracked scanners must define scanner coordinate systems which relate in the same way to how their positions are tracked and reported by the scanner tracking system (60 of FIG. 1). For example, the reported location of each scanner can be arranged to be the origin of its scanner coordinate system 10. Also, for any given scanner orientation reported by the tracking system, the scanner coordinate axes of every interchangeable scanner should point the same direction with respect to the object coordinate system 5.

An embodiment method for acquiring an approximation of the surface geometry of a 3-dimensional object, without needing to contact the object physically, comprises steps listed in FIG. 5. Step 500 of FIG. 5 defines an object (or global) coordinate system 5 in which the object to be scanned resides. Coordinate system 5 may be the de facto coordinate system of a scanner tracking system as described above. The coordinate system 5 may be a static user-defined coordinate system, in which the object may not be moved during scanning. The coordinate system 5 may be dynamic with respect to the tracking system but in a fixed relationship to the object as the object or scanner moves during scanning. For example, the coordinate system 5 may be defined with respect to (the position indicator or indicators of) a secondary, reference object (not shown) affixed to the scanned object.

Step 510 projects a known pattern of structured light onto an object, producing illuminated surface points on the intersection between the pattern and the object. The structured pattern may be as simple as a ray-like laser beam, a thin plane of light, a complex pattern generated by coherent light through a hologram, or any other pattern, as previously discussed. Step 510 is the first of several repeated steps, the last of which is step 590.

Step 520 forms an image of the intersection of the pattern of light on the object. This step may use one or more video cameras, positioned in some known relationship to the pattern, as described previously. In the simple embodiment projecting a ray-like beam of light, the image may be formed on a 1-dimensional sensor. In a general embodiment, the image of each camera would be 2-dimensional.

Step 530 processes points in the image of the intersection to obtain a set of 3D coordinates of corresponding surface points on the intersection, where the 3D coordinates are relative to the pattern of light. Standard practice may conveniently establish a local scanner 3D coordinate system 10 relative to which the pattern of light may be described as vectors, planes, curved surfaces, and so forth according to normal 3D analytic geometry. Similarly, the relationship of an image point to the intersection point which produces the image point may be described according to the scanner coordinate system 10. This involves the straightforward application of 3D analytic geometry, where the locations of the image plane pixels and the effective center of camera lens (treated as a pin-hole camera) are at known scanner coordinates. An intersection point on the surface of the object lies at the 3D intersection of the pattern and the line passing through an image plane subpixel location and through the effective center of the lens. For example, if the structured light pattern is a plane, the plane and the line through the image subpixel and lens intersect at a 3D point, which lies on the illuminated part of the object.

Step 540 wirelessly transmits the intersection point coordinates generated in step 530, which are coordinates of surface points. The wireless medium may be any of those examples listed earlier or any other suitable wireless medium. The data format may be any of those examples described earlier or any other suitable format.

Step 550 tracks the spatial location and orientation (position) of the projected pattern of light in the object coordinate system 5. In practice, a scanner tracking system will track the spatial location and orientation of the source of light, the scanner containing the source, and specifically one or more position indicators affixed to the scanner. Note that step 550 may be executed in parallel with any or all of steps 510 through 540.

It may be most convenient to define the scanner coordinate system mentioned in step 530 so that the origin of the scanner coordinate system 10 coincides with the location of the scanner which the scanner tracking system reports as the location of the scanner. It may be most convenient to define the local (scanner) coordinate system mentioned in step 530 so that the directions of each of the X, Y, and Z axes of the local coordinate system are parallel to the directions of the corresponding axes of the object (global) coordinate system when the scanner is in the reference orientation (that is, the orientation matrix is the identity matrix).

Step 560 wirelessly receives the processed surface point coordinates transmitted in step 540, associating each coordinate set with the spatial location and orientation of the pattern of light at the time the image associated with the surface point data was formed. An embodiment may be so configured that this naturally happens, because the timing of steps 510 through 540 is effectively contemporaneous with step 550. An embodiment may associate coordinate sets with scanner positions by assigning to each a timestamp from a common clock (or synchronized clocks) and performing the associations by matching together coordinate sets and scanner positions which both have a common timestamp.

In an embodiment the times of capturing images in a scanner and the times at which the scanner position is determined may be asynchronous or at least may not closely match. In such an embodiment, the position of the scanner for a specific time (such as the time an image was captured) may be interpolated from two or more known positions of the scanner which are at times very close to the time of the image capture. For example, suppose the scanner position is known at two times $t_0$ and $t_1$ which fall on each side of the time t, at which the image was acquired. Then linear interpolation may applied individually to each scanner position coordinate, such as $X_0$ at $t_0$ and $X_1$ at $t_1$, so that the estimated value of X at time t is $$X=X_0*(t_1-t)/(t_1-t_0)+X_1*(t-t_0)/(t_1-t_0).$$

and so forth for the other location and orientation coordinates. For greater accuracy, four times at which the scanner position in known (two times on either side of time t) may be used for cubic interpolation.

Step 570 transforms each surface point relative to the projected pattern (that is, expressed in coordinates relative to the scanner coordinate system) into corresponding coordinates in the object coordinate system. This may be accomplished by applying a transformation matrix T to each of the scanner coordinates to produce coordinates relative to the object coordinate system, according to common practice in the art. The transformation matrix T varies as the scanner moves, and may be directly derived from the location and orientation of the associated position of the pattern of light (that is, essentially the position of the scanner). The transformation matrix T may be the matrix product of a translation transformation matrix (directly based on the location of the scanner) and a rotation transformation matrix (directly based on the orientation of the scanner).

As the pattern of structured light is moved across the surface of the object, step 580 accumulates the transformed surface point coordinates to form a "point cloud". These points may approximate at least a portion of the surface of the object. An embodiment may display the points on a 2D screen either while the object is being scanned or after all the surface points are accumulated. An embodiment may discard obviously erroneous "outlier" points, which in a practical system may be generated, for example, by noise in the video camera or in the scanner electronics, by reflection artifacts, or by too rapid motion of the scanner.

Step 590 directs the pattern of light to be moved with respect to the object, so that a new set of points on the surface are illuminated by the intersection. Step 590 directs execution back to step 510 to process the new input until sufficient points are accumulated. This is the last step of a set of repeated steps which may be repeated until the approximation satisfactory models the object. Satisfactory termination may be based on the percentage of surface area of the object that has been modeled, the minimum density of surface points acquired, or some other condition.

Step 595 may generate a tessellation of patches modeling the surface of the object. The patches may use some or all of the accumulated surface points as vertices or control points for the patches, as is common in 3D computer graphics. The resulting tessellation may be displayed on a graphics screen in addition to or instead of the accumulated surface points of step 580. Conventional computer graphics shading may be applied.

Figure 6:
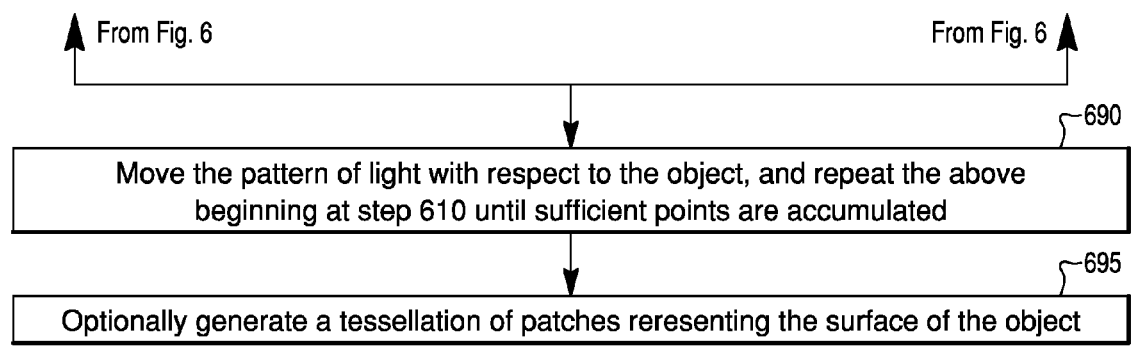
FIG. 6 depicts a flow diagram of the steps of another embodiment of the method.

FIG. 6 summarizes another embodiment method for wirelessly acquiring an approximation of the surface geometry of a 3-dimensional object, without needing to contact the object physically.

Steps 600, 610, 620, 650, 670, 680, 690, and 695 of FIG. 6 are identical respectively to steps 500, 510, 520, 550, 570, 580, 590, and 595 of FIG. 5. Only the steps of FIG. 6 which differ from corresponding steps of FIG. 5 will be explained below.

Step 630 processes the image to obtain a set of one or more 2D pixel coordinates of points on the image of the intersection. While these coordinates may simply be integral pixel coordinates in the frame of an imager of the scanner, interpolation may be used to obtain higher resolution 2D coordinates of points in the image. The pixel coordinates may be interpolated within rows, within columns, or within areas which contain portions of the image. Where a portion the image forms a curved or straight line, subpixel image points may be limited to those which are on the centerline or the centroid of the portion.

Step 640 wirelessly transmits the processed pixel or subpixel coordinates to a receiver. The format of the transmitted data may be something like that of formats 401, 403, or 404 of FIG. 4. Step 640 parallels step 540 of FIG. 5, except that points in the image of the intersection are not yet converted to 3D coordinates of points on the intersection itself. That is, the conversion is delayed until a later step. The method of FIG. 6 may be used in order to reduce the amount of computation required by the scanner.

Step 660 wirelessly receives the processed pixel coordinates, associating each coordinate set with the spatial location and orientation of the pattern of light at the time the image associated with the surface point data was formed.

Step 665 requires geometrical information about the shape, location, and orientation of the pattern of structured light of step 610. Step 665 also requires geometrical information about the location, orientation, and focal length (or lens location) of the video camera (or other imager) with respect to the pattern of light. The specific information about a particular scanner may be stored in a database and be accessed by means of the serial number of the scanner. An embodiment may be able to download this information from the scanner itself through the same means which transmits the pixel coordinate data.

Using the geometrical information about the 3D relationship of the image to the pattern of light, step 665 converts the pixel coordinates to 3D surface point coordinates relative to a scanner coordinate system defined with respect to the pattern of light. This is essentially the same computation that was performed in step 530 of FIG. 5, where it was performed before the wireless transmission and reception of the data characterizing a portion of the surface of the object (the intersection) relative to the scanner.

Once the coordinates of the intersection for any given position of the scanner relative to the object have been transformed into object (global) coordinates, the method of FIG. 6 proceeds like steps 570 through 595 of FIG. 5.

In an embodiment which allows the object being scanned to be moved so that the object (global) coordinate system moves with the object, the scanner may not need to be moved at all. The object itself may be moved and rotated so that the (potentially stationary) pattern of structured light eventually intersects with the entire surface of the object (or at least all parts of interest on the surface). See step 590 of FIG. 5 or step 690 of FIG. 6.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

We claim:

1. A method for acquiring an approximation of a surface geometry of a 3-dimensional object comprising:

establishing an object coordinate system in known relationship to the object;

projecting a pattern of structured light of known geometry onto the object;

forming an image of an intersection of the pattern of structured light with the object;

processing the image to generate a set of data characterizing the intersection relative to a position of the pattern of structured light;

wirelessly transmitting some portion of the image and intersection data to a receiver;

receiving the transmitted portion of the image and intersection data;

tracking the position of the pattern of structured light;

associating each intersection datum with the position of the projected pattern of light at the time the image corresponding to the datum was formed;

transforming each intersection datum into coordinates of the object coordinate system; and accumulating the transformed coordinates to form an approximation of the surface of the object.

2. The method of claim 1, wherein the projecting of the pattern of light projects a narrow ray-like beam of light.

3. The method of claim 1, wherein the projecting of the pattern of light projects a planar fan of light.

4. The method of claim 1, wherein the image processing excludes all video data from the transmitted intersection data, except data characterizing the image of intersection.

5. The method of claim 1, wherein the position tracking utilizes triangulation calculation.

6. The method of claim 1, wherein the processing of the image generates 3D coordinates of one or more points in the intersection relative to a coordinate system in known relationship to the projected pattern of structured light.

7. The method of claim 1, wherein the processing of the image generates 3D coordinates of one or more points in the intersection relative to a coordinate system in known relationship to the image.

8. The method of claim 1, wherein the processing of the image generates 2D coordinates of one or more points in the image of the intersection.

9. The method of claim 8, wherein 3D coordinates of one or more points in the intersection are computed after receiving the 2D coordinates.

10. The method of claim 1, wherein the intersection data is transmitted using an industry standard communication protocol.

11. The method of claim 1, wherein the intersection data is transmitted using a proprietary data communication protocol.

12. The method of claim 1, wherein the position of the projected pattern of structured light is tracked by tracking at least one position indicator on an assembly which houses a source of the projected pattern of light.

13. The method of claim 1, further comprising the step of generating a tessellation of patches representing the surface of the object based on accumulated transformed coordinates.

14. The method of claim 1, wherein the intersection data includes a representation of the color of at least one point on the surface of the object.

15. The method of claim 1, further comprising a step of wirelessly transmitting to a receiving workstation the transformed coordinates which form an approximation of the surface of the object.

16. A system for acquiring an approximation of a surface geometry of a 3-dimensional object comprising:

means for establishing an object coordinate system in known relationship to the object;

means for projecting a pattern of structured light of known geometry onto the object;

means for forming an image of an intersection of the pattern of structured light with the object;

processing means for generating a set of data characterizing the intersection relative to a position of the pattern of light;

transmitting means for transmitting some portion of the image or intersection data to a receiver; receiving means for receiving the transmitted processed intersection data;

tracking means for tracking the position of the projected pattern of structured light;

means for associating each intersection datum with the position of the projected pattern of light at the time the image corresponding to the datum was formed;

transforming means for transforming each intersection datum into coordinates of the object coordinate system; and accumulating means for accumulating the transformed coordinates to form a model approximating the surface geometry of the object.

* * * * *